(12) United States Patent
Tosu

(10) Patent No.: US 8,136,229 B2
(45) Date of Patent: Mar. 20, 2012

(54) METHOD OF PRODUCING VARIANT-SHAPED LAMINATED CORE

(75) Inventor: Norio Tosu, Kitakyushu (JP)

(73) Assignee: Mitsui High-Tec, Inc., Kitakyushu-shi, Fukuoka (JP)

( * ) Notice: Subject to any disclaimer, the term of this patent is extended or adjusted under 35 U.S.C. 154(b) by 380 days.

(21) Appl. No.: 12/440,492

(22) PCT Filed: Apr. 14, 2008

(86) PCT No.: PCT/JP2008/057294
§ 371 (c)(1),
(2), (4) Date: Mar. 9, 2009

(87) PCT Pub. No.: WO2008/133090
PCT Pub. Date: Nov. 6, 2008

(65) Prior Publication Data
US 2010/0043202 A1 Feb. 25, 2010

(30) Foreign Application Priority Data
Apr. 25, 2007 (JP) ................................ 2007-115887

(51) Int. Cl.
*H01F 7/06* (2006.01)

(52) U.S. Cl. ............. 29/606; 29/602.1; 29/605; 29/607; 336/200; 336/234

(58) Field of Classification Search ............... 29/417, 29/592.1, 602.1, 604–607; 336/200, 234
See application file for complete search history.

(56) References Cited

U.S. PATENT DOCUMENTS 4,427,462 A * 1/1984 Senno et al. ................. 148/308
(Continued)

FOREIGN PATENT DOCUMENTS
EP 0 500 431 A1 8/1992
(Continued)

OTHER PUBLICATIONS

International Search Report of PCT/JP2008/057294, mailing date of May 27, 2008.

*Primary Examiner* — Paul D Kim
(74) *Attorney, Agent, or Firm* — Westerman, Hattori, Daniels & Adrian, LLP (57) ABSTRACT

A method of producing a laminated variant-shaped core 10, includes punching out core sheets 12-14 from a strip 11 to form the outlines of the core sheets 12-14, and push back the punched out core sheets 12-14 into the strip 11; forming cutouts 28, 30 and 32 reaching outer peripheries of outer plates 27, 29 and 31, the outer plates 27, 29 and 31 being the same in outer shape and respectively containing thereinside the core sheets 12-14, the cutouts 28, 30 and 32 having inner edges respectively in contact with the core sheets 12-14; forming caulking portions 21 in each of the core sheets 12-14 and caulking portions 33 in each of the outer plates 27, 29 and 31; punching out the outer plates 27, 29 and 31 from the strip 11 to form the outlines of the outer plates 27, 29 and 31, and laminating and interlocking the core sheets 12-14 to form the variant-shaped laminated core 10 and laminating and interlocking the outer plates 27, 29 and 31; and removing the outer plates 27, 29 and 31 located outside the laminated and interlocked variant-shaped core 10.

6 Claims, 7 Drawing Sheets

U.S. PATENT DOCUMENTS

| | | | |
|---|---|---|---|
| 4,524,507 A * | 6/1985 | Hara et al. | 29/564.2 |
| 4,876,473 A * | 10/1989 | Tanaka et al. | 310/216.018 |
| 5,095,610 A * | 3/1992 | Schultz et al. | 29/596 |
| 6,658,721 B2 * | 12/2003 | Kazama et al. | 29/596 |
| 7,038,349 B2 * | 5/2006 | Suzuki et al. | 310/216.008 |
| 2003/0066183 A1 * | 4/2003 | Nouzumi | 29/596 |
| 2005/0050714 A1 * | 3/2005 | Hashimoto et al. | 29/596 |
| 2006/0279160 A1 * | 12/2006 | Yoshinaga et al. | 310/216 |

FOREIGN PATENT DOCUMENTS

| | | |
|---|---|---|
| EP | 1 473 548 A2 | 11/2004 |
| EP | 1 538 421 A2 | 6/2005 |
| JP | 4 366716 A | 12/1992 |
| JP | 2002-039794 A | 2/2002 |
| JP | 2004-325386 A | 11/2004 |
| JP | 2005-164486 A | 6/2005 |

\* cited by examiner

Fig.1(A)

(Step E)

[Prior Art]

Fig. 7

(1) Successively form 3rd lamination units to be located at top

- Remove one 3rd lamination unit for use in single laminated core from successively formed units (2) Successively form 2nd lamination units to be located at middle

- Remove one 2nd lamination unit for use in single laminated core from successively formed units (3) Successively form 1st lamination units to be located at bottom

- Remove one 1st lamination unit for use in single laminated core from successively formed units

- Integrate removed 1st–3rd lamination units by using caulking projections and caulking recesses, to produce variant-shaped laminated core

[Prior Art]

METHOD OF PRODUCING VARIANT-SHAPED LAMINATED CORE

TECHNICAL FIELD

The present invention relates to a method of producing a variant-shaped laminated core applicable to reluctance type resolvers or variable reluctance type resolvers used for, for example, measurement of rotating speed or rotation angle and detection of position, and relates to a variant-shaped laminated core produced by this method.

BACKGROUND ART

The measurement of rotating speed or rotation angle, detection of position, etc. have employed reluctance type resolvers or variable reluctance type resolvers (see, for example, Patent Documents 1 and 2).

Figure 6:
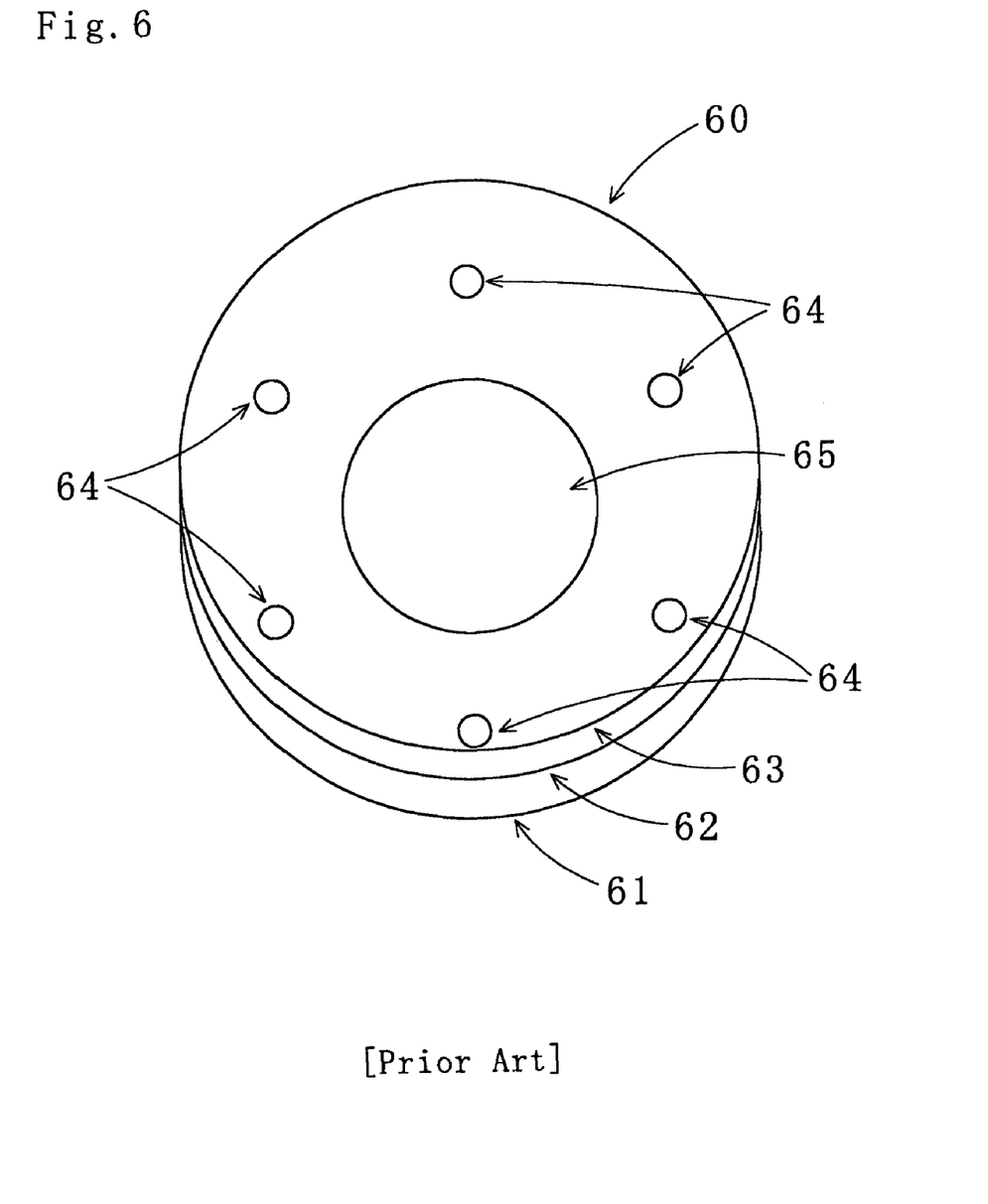
FIG. 6 is a plan view of a variant-shaped laminated core according to the prior art.

In such reluctance type resolvers, there is incorporated a variant-shaped laminated core 60 as shown in FIG. 6 in which are laminated core sheets of plural different types as regards the outer shape or size (core sheets of each of the types form a respective one of first to third laminated bodies 61 to 63 for example). Examples of variant-shaped laminated cores each comprising core sheets of different outer shapes include a variant-shaped laminated core formed by laminated core sheets having off-centered shaft holes.

For accuracy improvement in the measurement of rotating speed or rotational angle and in detection of position with use of the variant-shaped laminated core 60, it is required that the core sheets are firmly integrated. For this reason, in the production of the variant-shaped laminated core 60, the core sheets are laminated and interlocked by caulking portions 64. Note that in FIG. 6, reference numeral 65 denotes a shaft hole.

A single press die device punches out core sheets of the same outer shape. In the case of punching out of core sheets of plural different types as regards the outer shape or size, press die device types need to be replaced for adaptation to the type of core sheets to be punched out.

Further, also in the case where plural types of core sheets are punched out, then laminated and interlocked, the changing of press die device types is needed to punch out core sheets of different types, which lowers productivity.

Figure 7:
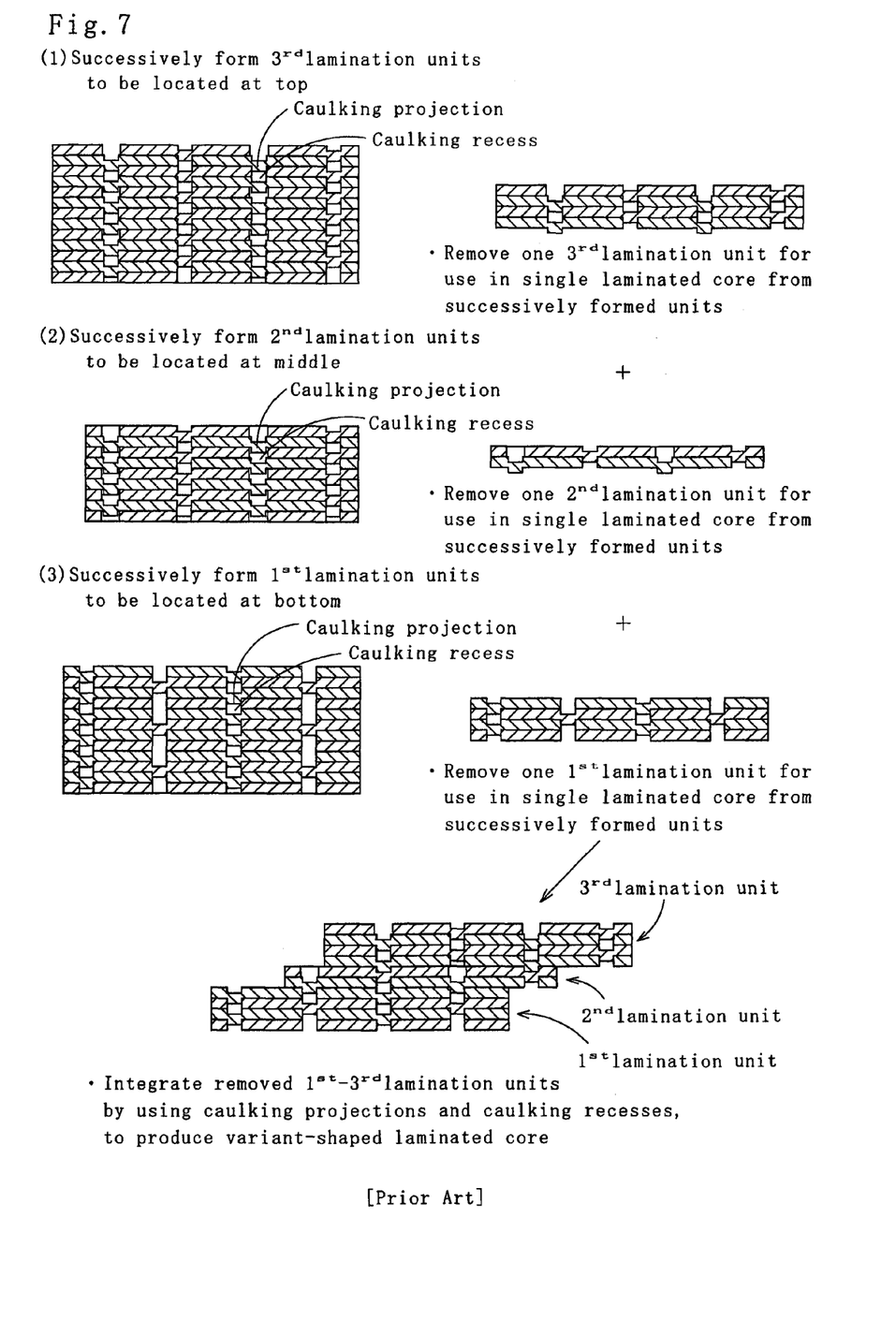
FIG. 7 is an explanatory view of a method of producing the variant-shaped laminated core according to prior art.

To solve this problem, a technique as shown in FIG. 7 has been employed. This technique is by: punching out one type of core sheets successively using a press die device of the type corresponding to the type of the core sheets punched out; laminating the punched out core sheets to a thickness greater than required for use in a single variant-shaped laminated core thereby to form a successive lamination; taking out, from the successive lamination, a portion (a lamination unit) to be integrated in a variant-shaped laminated core; and combining the lamination unit with lamination units of other core sheet types that have been taken out in the same manner.

[Patent Document 1]
Japanese Unexamined Patent Application Publication No. 2002-39794
[Patent Document 2]
Japanese Unexamined Patent Application Publication No. 2005-164486

DISCLOSURE OF INVENTION

Problems to be Solved by the Invention

In the above removal of a portion to be integrated in the single variant-shaped laminated core from a successive lamination of one core sheet type, however, there is a need to disengage coupling between caulking projections and caulking recesses formed in the adjacently laminated core sheets, which is a time and labor consuming process. decreasing productivity of variant-shaped laminated cores.

To solve this problem, another empirical technique has been employed. In this technique, in forming successive lamination from core sheets of one type, through-holes are created in a core sheet to be placed on each lamination unit for use in a single variant-shaped laminated core such that the through-holes do not engage caulking projections of a next core sheet to be placed thereon. This technique facilitates relatively easy removal of an intended lamination unit having a required thickness. This technique, however, has a problem that the core sheet having the through-holes, unable to engage with the previously laminated core sheet, turn out to be a waste core sheet, thereby lowering material yield.

The present invention has been made under these circumstances, and it is an object of the present invention to provide a method of producing a variant-shaped laminated core that permits dramatic productivity improvement when compared with conventional methods, and to provide a variant-shaped laminated core produced by the method.

Means for Solving the Problem

To accomplish the object, a first invention provides a method of producing a variant-shaped laminated core by punching out core sheets of plural different types as regards as least one of outer shape and size from a strip to be processed, and by laminating and interlocking the plural types of core sheets, the method comprising:

Step A of punching out a required number of core sheets for each of the plural types from the strip being transferred, to form the outlines of the core sheets, and push back the punched out core sheets into the strip;

Step B of forming at least two opposed cutouts, the cutouts reaching an outer periphery of each of outer plates, the outer plates being the same in outer shape and respectively containing thereinside the core sheets, the cutouts each having inner edges reaching each of the core sheets;

Step C of forming caulking portions for interlocking in each of the core sheets;

Step D of punching out the outlet plates from the strip to form the outlines of the outer plates and laminating and interlocking the core sheets to form the variant-shaped laminated core; and Step E of removing the outer plates located outside the laminated and interlocked variant-shaped core.

By "punching out the core sheets of the plural types to form the outlines of the plural types of core sheets" as used therein, it is meant not only punching out the entire core sheet from the strip but also punching the strip such that part of the core sheet is left integral with the strip.

The outer plate may be of any shape as long as it is capable of containing the core sheet therein. The outer plate preferably has beveled corners if it is, for example, of a rectangular outer shape.

A second invention provides the method according to the first invention, wherein in Step C, caulking portions for interlocking are formed also in each of the outer plates, and in Step D, the outer plates are also laminated and interlocked.

A third invention provides the method according to the second invention, wherein the formation of the caulking portions in each of the outer plates is carried out simultaneously with or separately from the formation of the caulking portions in each of the core sheets.

A fourth invention provides the method according to any one of the first-third inventions, wherein
1) Step C is carried out after Step A, and
2) Step B is carried out before Step A, or between Step A and Step C, or between Step C and Step D.

A fifth invention provides the method according to any one of the first-fourth inventions, wherein for each type of core sheets, the plural core sheets of the same configuration are laminated one on another.

A sixth invention provides the method according to any one of the first-fifth inventions, wherein the removal of the outer plates located outside the laminated and interlocked variant-shaped core is carried out by drawing the outer plates apart with respect to the cutouts.

A seventh invention provides a variant-shaped laminated core produced by a method according to any one of the first-sixth inventions.

Effect of the Invention

In the methods according to the first-sixth inventions and the variant-shaped laminated core according to the seventh invention, the core sheets of different outer shapes and/or sizes are punched out from the strip to be processed and pushed back into the strip; the strip containing the pushed back core sheets therein is punched to produce the outer plates of the same outer shape, so that each outer plate contains one core sheet therein; the core sheets are laminated and interlocked to form the variant-shaped laminated core; and the outer plates located outside are removed from the laminated and interlocked variant-shaped core. Accordingly, in alteration of at least one of the outer shape and the size of the core sheets for production of the variant-shaped laminated core, it is not necessary to change press die devices each time a desired number of core sheets of one type have been punched out.

This allows application of a production scheme using progressive press die equipment to the production of a variant-shaped laminated core. Thus, unlike in conventional methods, there is no need to punch out and laminate a greater number of core sheets of each type than required for production of a single variant-shaped laminated core and to extract, from the laminated core sheets, a portion of core sheets to be integrated in a variant-shaped laminated core. Consequently, dramatic improvement is achieved in productivity of variant-shaped laminated cores.

In the method especially according to the second invention, the caulking portions are formed also in each outer plate and the outer plates are also laminated and interlocked. The interlocked outer plates serve as one block, facilitating the disposal and handling thereof.

In the method according to the third invention, the formation of the caulking portions in each outer plate is carried out simultaneously with or separately from the formation of the caulking portions in each core sheet. Thus, the positional accuracy of the caulking portions is improved and the number of steps is reduced, especially in the case of the simultaneous formation of the caulking portions.

In the method according to the fourth invention, Step A of punching out and push back the core sheets is followed by Step C of forming the caulking portions in each core sheet. Thus, the risk of crushing the formed caulking portions is eliminated, and consequently, the core sheets (and the outer plates as well if the caulking portions are formed therein) are reliably laminated and interlocked.

Further, since Step B of forming the two opposed cutouts is carried out before Step D of laminating and interlocking the core sheets, the laminated outer plates located outside the laminated and interlocked variant-shaped core are easily removed from the laminated and interlocked variant-shaped core at the cutouts.

In the method according to the fifth invention, for each type of core sheets, the plural core sheets of the same configuration are laminated one on another. This allows easy production of a variant-shaped laminated core according to its intended use.

The variant-shaped laminated core according to the seventh invention is capable of being produced using progressive press die equipment and thus has improved geometric accuracy and quality.

EXPLANATION OF NUMERALS

10: variant-shaped laminated core, 11: strip material (strip to be processed), 12-14: core sheets, 15: first variant-shaped core, 16: second variant-shaped core, 17: third variant-shaped core, 18-20: shaft holes, 21: caulking portion, 22, 23: pilot holes, 24-26: punched holes, 27: outer plate, 28: cutout, 29: outer plate, 30: cutout, 31: outer plate, 32: cutout, 33: caulking portion.

BEST MODE FOR CARRYING OUT THE INVENTION

An embodiment of the present invention will now be described referring to the accompanying drawings for better understanding of the present invention.

Description will be made first of a variant-shaped laminated core obtained by a method of producing the same according to an embodiment of the present invention, and next, of the method.

As shown in FIGS. 1-5, a variant-shaped laminated core 10 is capable of being incorporated in, for example, a reluctance type resolver or a variable reluctance type resolver. The variant-shaped laminated core 10 is produced by punching from a strip material (for example, a silicon steel strip of 0.15-0.5 mm thickness) 11, and example of a strip to be processed, to produce core sheets 12-14 of plural (in the present embodiment, three) different types as regards the size, a required number of core sheets for each type, and by laminating and interlocking the punched out core sheets 12-14.

Figure 5A:
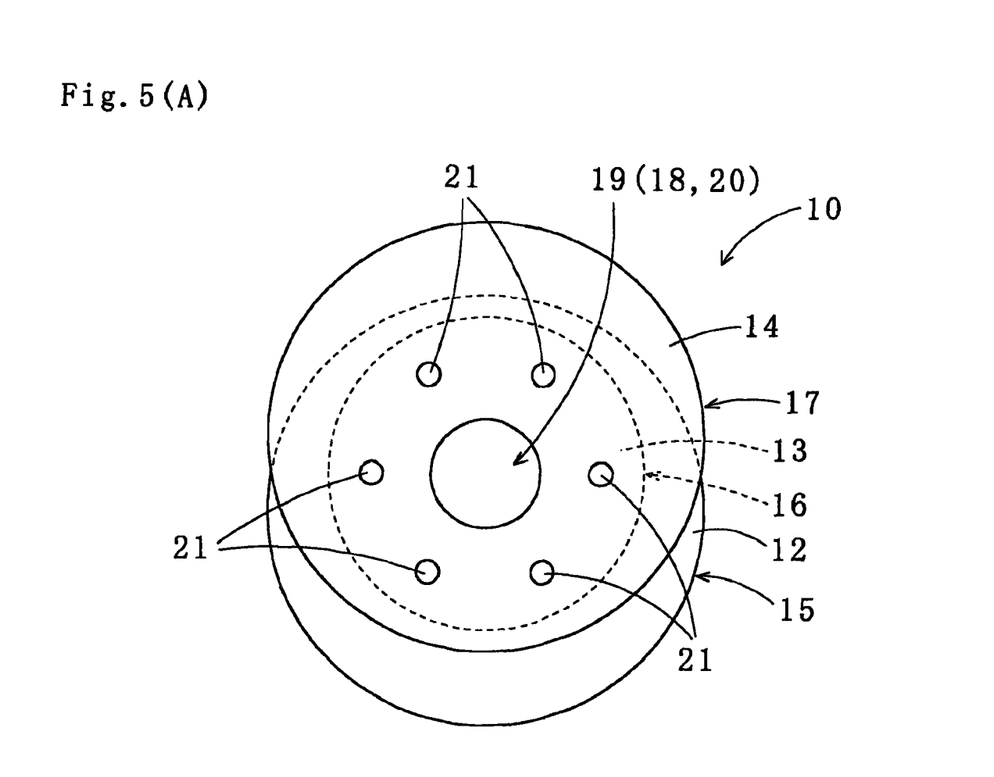
FIGS. 5(A) and 5(B) are a plan view and a side view, respectively, of the variant-shaped laminated core prepared by the method.
Figure 5B:
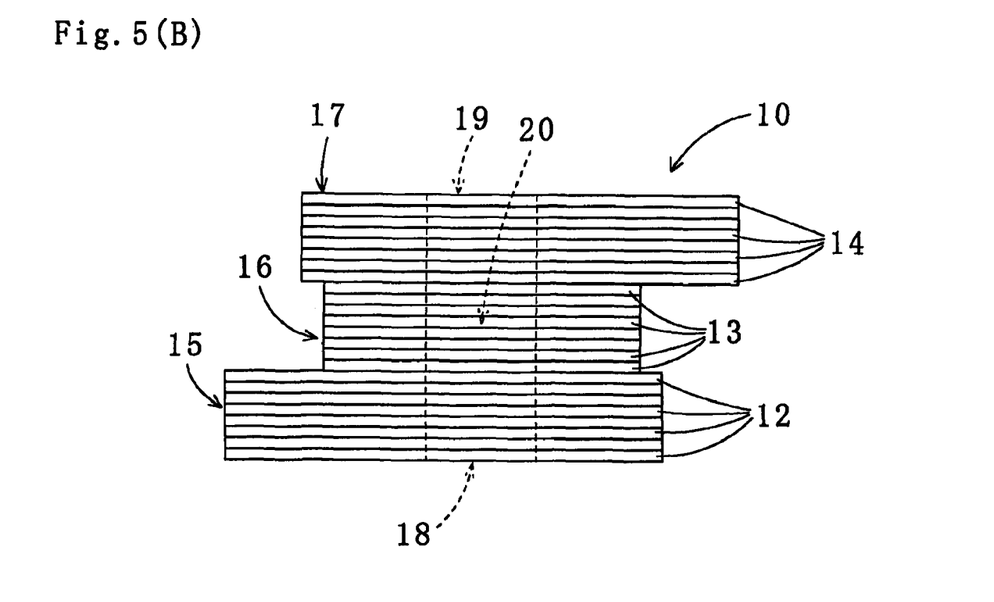

The variant-shaped laminated core 10 includes a first variant-shaped core 15 located at the lowest position, a second variant-shaped core 16 located on the first variant-shaped core 15, and a third variant-shaped core 17 located on the second variant-shaped core 16. The first variant-shaped core 15 is obtained by laminating and interlocking plural (for example, about three to ten) core sheets 12 which are circular when viewed from the top. The second variant-shaped core 16 is obtained by laminating and interlocking plural (for example, about three to ten) core sheets 13 which are circular when viewed from the top. The third variant-shaped core 17 is obtained by laminating and interlocking plural (for example, about three to ten) core sheets 14 which are circular when viewed from the top. The lowermost core sheet 13 of the second variant-shaped core 16 is also laminated on, and interlocked with, the uppermost core sheet 12 of the first variant-shaped core 15. The lowermost core sheet 14 of the third variant-shaped core 17 is also laminated on, and interlocked with, the uppermost core sheet 13 of the second variant-shaped core 16.

The core sheet 12, which constitutes the first variant-shaped core 15, and the core sheet 14, which constitutes the third variant-shaped core 17, are the same in outer diameter, while shaft holes 18 and 19 of the respective core sheets 12 and 14 formed in central areas thereof are located 180° apart from each other with respect to the centers of the core sheets 12 and 14. The core sheet 13, which constitutes the second variant-shaped core 16, is smaller in outer diameter than the core sheets 12 and 14, while a shaft hole 20 is coaxial with the core sheet 13.

Plural (in the present embodiment six) caulking portions 21 are arranged circumferentially equidistantly about each of the shaft holes 18-20 of the respective core sheets 12-14 and with each of the axes of the shaft hole 18-20 as a center. By means of the caulking portions 21, the core sheets 12-14 are laminated and interlocked.

With the shaft holes 18-20 aligned with each other and also the caulking portions 21 aligned with each other when viewed from the top, the core sheets 12-14 are laminated and interlocked.

Referring now to FIGS. 1-5, description will be made of the method of producing a variant-shaped laminated core according to an embodiment of the present invention. First, the strip material (for example, a silicon steel strip of 0.15-0.5 mm thickness) 11 is prepared which is long enough to produce the core sheets 12-14. The strip material 11 is introduced into a pressing equipment adapted to perform pressing operations at least in Step A to Step D sequentially. By unillustrated transfer means, the strip material 11 is transferred from Step A to Step D sequentially in an intermittent manner that is based on pilot holes 22 and 23.

Figure 2A:
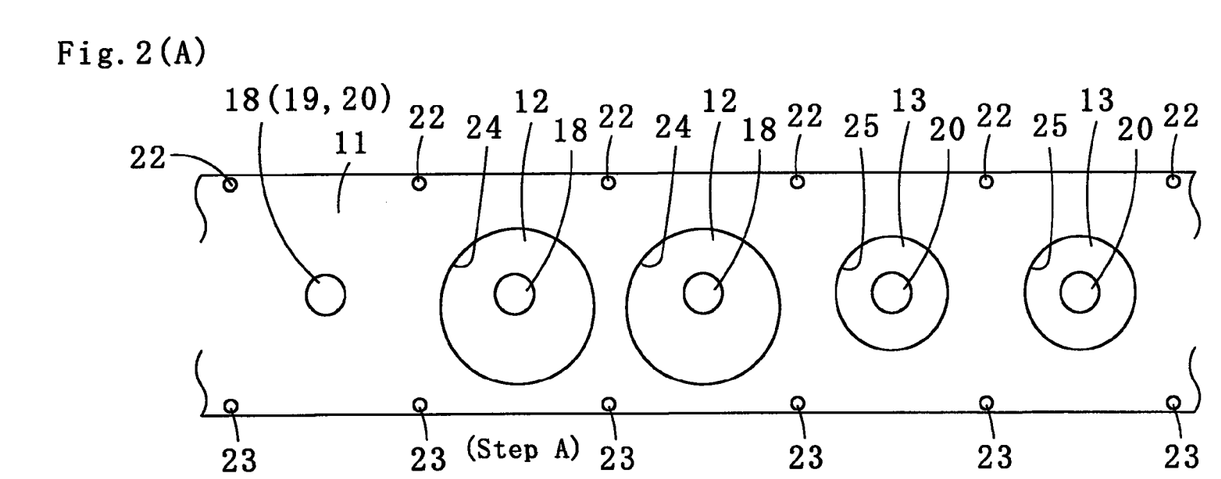
FIGS. 2(A) and 2(B) are respectively a plan view for explaining Step A of the method and a plan view for explaining Step A and Step B of the method.

In a preparation step, as shown in FIG. 2(A), the pilot holes 22 and pilot holes 23 are formed at a predetermined pitch on the lateral sides of the strip material 11. Also, the shaft holes 18-20 for the respective core sheets 12-14 are formed each at the middle between the lateral sides of the strip material 11.

Next, in Step A, using a punch and a die (unillustrated), the outline of the circular core sheet 12, which constitutes the first variant-shaped core 15, is punched out, from the strip material 11 being transferred. While being held between the upper face of an ascent-and-descent platform in the die and the lower face of the punch, the punched out core sheet 12 is pushed back (by being lifted) into its initial position in the strip material 11.

Thus, the core sheet 12 is made separate from a punched hole 24 of the strip material 11 but hard to come off the punched hole 24.

The above operation is repeated for the number of the core sheets 12 required for production of the first variant-shaped core 15 (here, two sheets are shown for simplicity). Thus, the core sheets 12 are obtained.

Figure 2B:
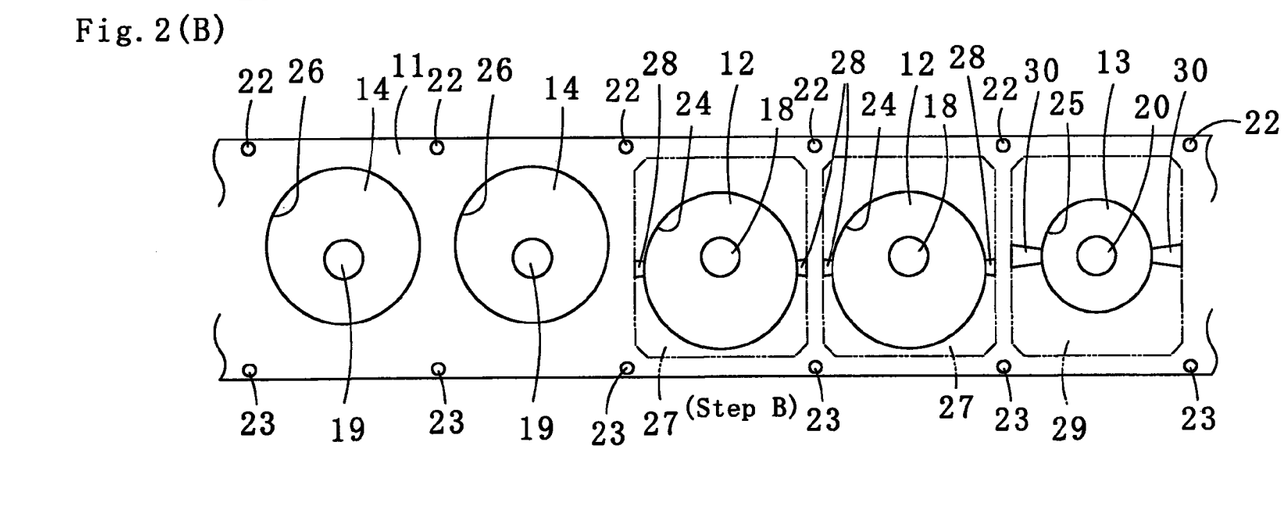

As shown in FIGS. 2(A) and 2(B), the above operation is preformed also for the core sheets 13, which constitute the second variant-shaped core 16, and for the core sheets 14, which constitute the third variant-shaped core 17, and then, the core sheets 13 and 14 are pushed back into their initial positions at punched holes 25 and 26, respectively, of the strip material 11.

The core sheets 12-14, which constitute the first to third variant-shaped cores 15-17, are sequentially punched out to form the outlines of the core sheets 12-14 in the following order: the core sheets 12, the core sheets 13, and the core sheets 14. In FIGS. 2(A) and 2(B), however, for simplicity of explanation, the core sheets 12-14 are illustrated as if they were punched out in the following order; the core sheets 14, the core sheets 13, and the core sheets 12. It is to be noted that dies and punches for blanking out the cores 13 and 14 halt their motions until a portion of the strip material 11 to be the core sheet 12 arrives at the punch and the die for blanking out the core sheet 12. The dies and the punches for blanking out the core sheets 12 and 14 halt their motions when the core sheet 13 passes these dies and punches, and the dies and the punches for blanking out the core sheets 12 and 13 halt their motions when the core sheet 14 passes these dies and punches.

Figure 3:
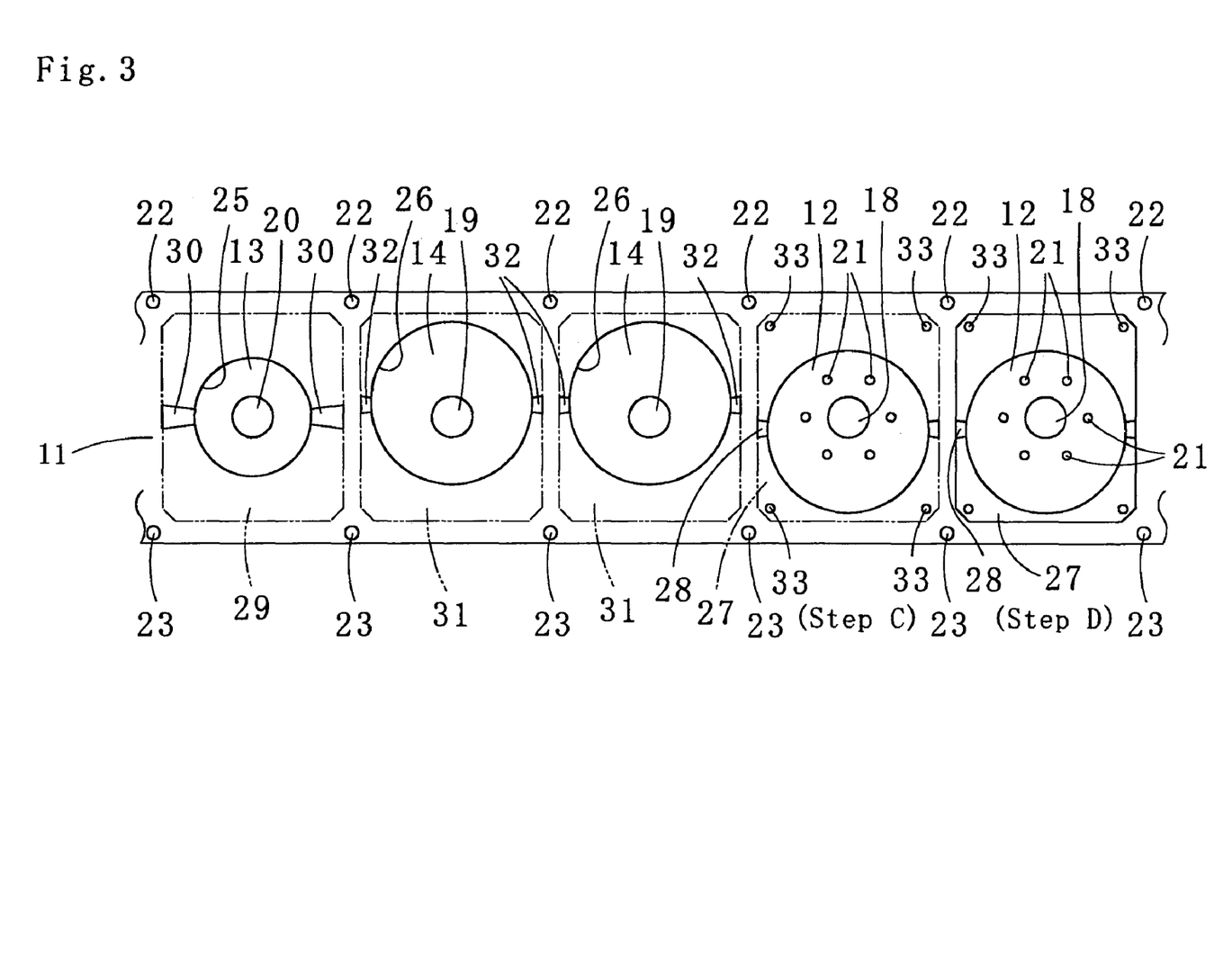
FIG. 3 is a plan view for explaining Step B-Step D of the method.

In Step B, as shown in FIG. 2(B), the outlines of two opposed cutouts 28 are formed using dies and punches. The two cutouts 28 have inner edges in contact with the core sheet 12 punched out in Step A, and reach outer edges of any outer plate 27 to be formed to contain thereinside the core sheet 12. Likewise, as shown in FIG. 2(B) and FIG. 3, the outlines of two cutouts 30 and the outlines of two cutouts 32 are formed using dies and punches. The two cutouts 30 reach outer edges of an outer plate 29 to be formed to contain thereinside the core sheet 13. The two cutouts 32 reach outer edges of an outer plate 31 to be formed to contain thereinside the core sheet 14. Four or more cutouts may be formed depending on the shape of the variant-shaped laminated core to be produced. In such a case, the angle made by the adjacent cutouts with respect to the center of the outer plate is 180 degrees or less.

The outer plate 27 is the same in outer shape as the outer plates 29 and 31, and thus these outer plates can be punched out by the same die device. In order to improve the material yield, it is desirable to have a shortest distance of at least 1-5 mm between the punched holes 24-26 of the strip material 11 and the outer peripheries of the outer plates 27, 29 and 31 which are to be made by punching.

Subsequently, in Step C, plural (in this embodiment, six) caulking portions 21 are formed in the core sheet 12 (in this embodiment, circumferentially equidistantly about the shaft hole 18). Also, plural (in this embodiment, four) caulking portions 33 are formed in the outer plate 27 (in this embodiment, at corners thereof) but not in the core sheet 12. The caulking portions 21 and the caulking portions 33 are formed simultaneously. However, the formation of the caulking portions 21 in the core sheets 12-14 may be carried out separately from the formation of the caulking portions 33 in outer plates 27, 29 and 31, using different die devices at different places.

In this embodiment, caulking holes to be the caulking portions 21 are formed in the lowest core sheet 12, and caulking holes to be the caulking portions 33 are formed in the lowest outer plate 27, using dies and punches. Also, caulking projections to be the caulking portions 21 are formed in the core sheets 12 other than the lowest core sheet 12, and caulking projections to be the caulking portions 33 are formed in the outer plates 27 other than the lowest outer plate 27, using dies and punches.

Though not illustrated, caulking projections to be the caulking portions 21 are formed in the core sheets 13 and 14, and caulking projections to be the caulking portions 33 are formed in the outer plates 29 and 31, in the same manner using dies and punches.

In Step D, using outline forming blanking die and punch, which makes a die device, the outer plate 27 in which the core sheet 12 is fitted, is punched out from the strip material 11 to form the outline. The punched out outer plates 27 with the core sheets 12 are dropped in the blanking die, and sequentially laminated and interlocked in the die device.

After the lamination and interlocking of the core sheets 12 and the outer plates 27, the core sheets 13 and the outer plates 29 holding the core sheets 13 therein are sequentially laminated and interlocked on the uppermost core sheet 12 and the outer plate 27. Then, the core sheets 14 and the outer plates 31 having the core sheets 14 therein are sequentially laminated and interlocked further on the now uppermost core sheet 13 and outer plate 29.

Figure 4A:
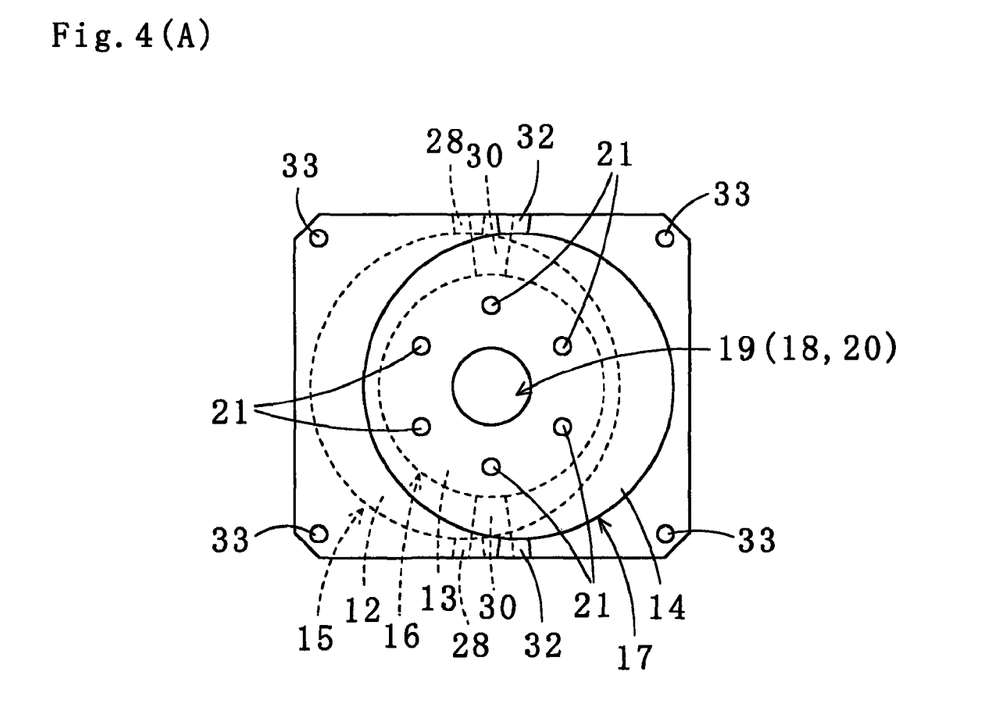
FIGS. 4(A) and 4(B) are a plan view and an elevational view, respectively, for explaining a state of a variant-shaped laminated core after the completion of Step D of the method.
Figure 4B:
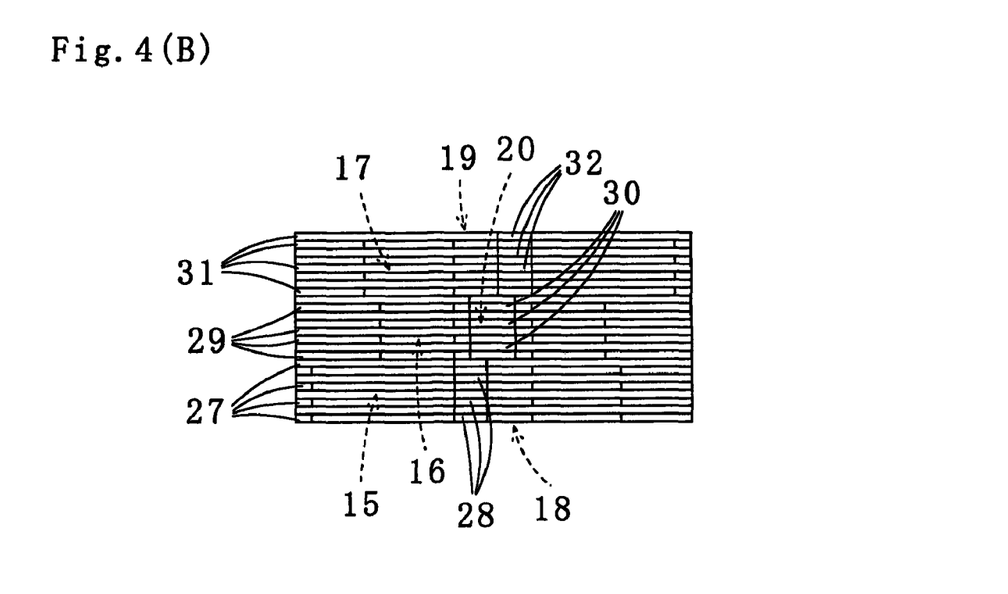

Thus, as shown in FIGS. 4(A) and 4(B), for each of the core sheet types 12-14, the plural core sheets of the same configuration are laminated one on another, and the vertically adjacent core sheets 12 and 13 and the vertically adjacent core sheets 13 and 14 are laminated and interlocked together.

Figure 1A:
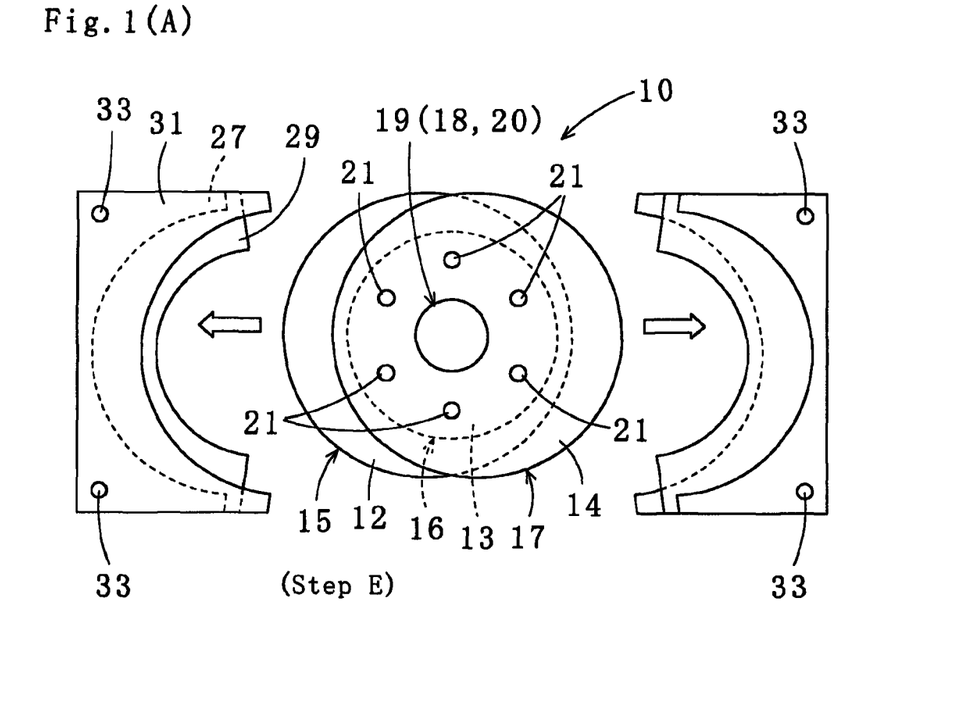
FIGS. 1(A) and 1(B) are a plan view and an elevational view in section, respectively, for explaining Step E of a method of producing a variant-shaped laminated core according to one embodiment of the present invention.
Figure 1B:
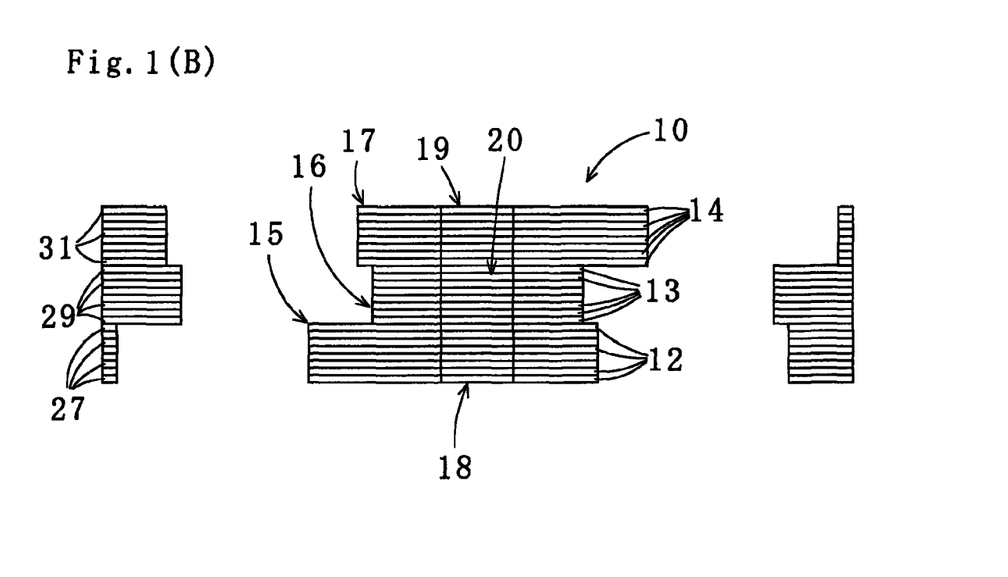

In Step E, as shown in FIGS. 1(A) and 1(B), the laminated outer plates 27, 29 and 31, located outside the variant-shaped laminated core 10 formed by the laminated and interlocked core sheets 12-14, are drawn apart from the variant-shaped laminated core 10 in opposite directions at the cutouts 28, 30 and 32 to remove the laminated outer plates 27, 29 and 31 from the laminated core sheets 12-14.

In the above description of production of the variant-shaped laminated core 10. Steps A-E are carried out sequentially in this order: Step A of punching out the outlines of the core sheets 12-14 from the strip material 11 and then pushing back the punched out core sheets 12-14 into the strip material 11; Step B of forming the cutouts 28, 30 and 32; Step C of forming the caulking portions 21 and 33; Step D of laminating and interlocking the core sheets 12-14, to produce the variant-shaped laminated core 10, and laminating and interlocking the outer places 27, 29 and 31 containing the core sheets 12-14 therein; and Step E of removing the laminated outer plates 27, 29 and 31 located outside the variant-shaped laminated core 10. However, the order is not limited to the above.

For example, Step C may be carried out after Step A, and Step B may be carried out either before Step A or between Step C and Step D. Carrying out Step C after Step A eliminates the risk of crushing the formed caulking portions, thereby to enable reliable lamination and interlocking of the core sheets and the outer plates. Carrying out Step B before Step A, or between Step A and Step C, or between Step C and Step D permits easy separation of the laminated and interlocked outer plates from the laminated and interlocked core sheets at the cutouts.

Thus, the variant-shaped laminated core 10 can be produced as shown in FIGS. 5(A) and 5(B).

Then, a shaft is inserted into the shaft holes 18-20 of the produced variant-shaped laminated core 10, and the variant-shaped laminated core 10 is subjected to predetermined processes, and after that, incorporated into a reluctance type resolver or a variable reluctance type resolver for use.

In the above, the invention has been described referring to the embodiment. However, it is to be understood that the invention is not limited to the embodiment but includes other embodiments and modifications without departing from the scope as set out in the accompanying claims. For example, methods of producing a variant-shaped laminated core and variant-shaped laminated cores produced by the same, obtained by combining all or part of the embodiment and all or part of such modifications, are therefore construed to be within the spirit and scope of the invention.

In the embodiment, description has been made of production of the variant-shaped laminated core from core sheets of different sizes. However, variant-shaped laminated cores may be produced from core sheets of plural different types as regards the outer shape, and further, they may be produced from core sheets of plural different types as regards both the outer shape and size. Also, though the core sheets down are circular when viewed from the top, the shape of the core sheets is not limited to a circle, and may be any as long as they are unable in reluctance type resolvers or variable reluctance type resolvers.

Though in the embodiment, die caulking portions in the core sheets and those in the outer plates are formed simultaneously, they may be formed in separate steps. Further, the formation of the caulking portions in the outer plates in the embodiment may be omitted.

INDUSTRIAL APPLICABILITY

The present invention permits application of a production scheme using progressive press die equipment to the production of variant-shaped laminated cores. Thus, the present invention eliminates the conventional need to punch out and laminate a greater number of core sheets of each of plural types than required for production of a single variant-shaped laminated core and to extract, from the laminated core sheets, a portion of core sheets to be integrated in variant-shaped laminated core. Consequently, the present invention permits dramatic improvement in productivity of variant-shaped laminated cores.

The invention claimed is:

1. A method of producing a variant-shaped laminated core by punching out core sheets of plural different types as regards at least one of outer shape and size from a strip to be processed, and by laminating and interlocking the plural types of core sheets, the method comprising:
    Step A of punching out a required number of core sheets for each of the plural types from the strip being transferred, to form the outlines of the core sheets, and push back the punched out core sheets into the strip;
    Step B of forming at least two opposed cutouts, the cutouts reaching an outer periphery of each of outer plates, the outer plates being the same in outer shape and respectively containing thereinside the core sheets, the cutouts each having inner edges reaching each of the core sheets;
    Step C of forming caulking portions for interlocking in each of the core sheets;
    Step D of punching out the outer plates from the strip to form the outlines of the outer plates and laminating and interlocking the core sheets to form the variant-shaped laminated core; and
    Step E of removing the outer plates located outside the laminated and interlocked variant-shaped core.

2. The method as defined in claim 1, wherein for each type of core sheets, the plural core sheets of the same configuration are laminated one on another.

3. The method as defined in claim 2, wherein in Step C, caulking portions for interlocking are formed also in each of the outer plates, and in Step D, the outer plates are also laminated and interlocked.

4. The method as defined in claim 3, wherein the formation of the caulking portions in each of the outer plates is carried out simultaneously with or separately from the formation of the caulking portions in each of the core sheets.

5. The method as defined in claim 1, wherein
1) Step C is carried out after Step A, and
2) Step B is carried out before Step A, or between Step A and Step C, or between Step C and Step D.

6. The method as defined in claim 1, wherein the removal of the outer plates located outside the laminated and interlocked variant-shaped core is carried out by drawing the outer plates apart with respect to the cutouts.

* * * * *